United States Patent
Yang et al.

(10) Patent No.: US 10,880,714 B2
(45) Date of Patent: Dec. 29, 2020

(54) ACCESS CONTROL AND SCHEDULING MECHANISM FOR MTC DEVICES

(71) Applicant: Verizon Patent and Licensing Inc., Arlington, VA (US)

(72) Inventors: Jin Yang, Orinda, CA (US); Sagiv Draznin, Walnut Creek, CA (US); Yee Sin Chan, San Jose, CA (US); Michael A. Lombardo, Bethlehem, PA (US); Lei Song, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/512,547

(22) Filed: Jul. 16, 2019

(65) Prior Publication Data
US 2019/0342735 A1 Nov. 7, 2019

Related U.S. Application Data

(63) Continuation of application No. 15/953,575, filed on Apr. 16, 2018, now Pat. No. 10,405,162, which is a
(Continued)

(51) Int. Cl.
| | |
|---|---|
| *H04W 4/70* | (2018.01) |
| *H04W 76/11* | (2018.01) |
| *H04W 8/20* | (2009.01) |
| *H04W 84/04* | (2009.01) |
| *H04W 48/06* | (2009.01) |
| *H04W 24/02* | (2009.01) |
| *H04W 76/18* | (2018.01) |
| *H04W 88/18* | (2009.01) |

(52) U.S. Cl.
CPC ............. *H04W 4/70* (2018.02); *H04W 8/205* (2013.01); *H04W 76/11* (2018.02); *H04W 84/042* (2013.01)

(58) Field of Classification Search
CPC ....... H04W 4/70; H04W 76/11; H04W 8/205; H04W 84/042
See application file for complete search history.

(56) References Cited

U.S. PATENT DOCUMENTS 9,767,485 B2 * 9/2017 Sotomayor ........ G06Q 30/0275
9,820,104 B2 * 11/2017 Cohen .................... H04L 67/18
(Continued)

*Primary Examiner* — Jenee Holland

(57) ABSTRACT

A method includes receiving, at a network control component, an enhanced subscriber profile identifier (E-SPID) associated with at least one machine type communications (MTC) user device from a home subscriber server (HSS). The method includes determining whether the E-SPID is in a first range of E-SPID values, wherein the first range of E-SPID values corresponds to a delay that exceeds a threshold, and interacting with a self-organizing network (SON) controller that interacts an operation administration maintenance (OAM) component to control and define a modified E-SPID based on network traffic and coverage in response to a determination that the E-SPID is in the first range of E-SPID values. The method further includes sending the modified E-SPID to at least one enhanced evolved node b (eNodeB) associated with the at least one MTC user device, wherein the at least one enhanced eNodeB is operable to perform access control and scheduling for the at least one MTC user device based on the E-SPID.

19 Claims, 8 Drawing Sheets

Related U.S. Application Data continuation of application No. 15/198,482, filed on Jun. 30, 2016, now Pat. No. 9,961,527.

(56) References Cited

U.S. PATENT DOCUMENTS

| | | |
|---|---|---|
| 2001/0038609 A1 | 11/2001 | Yamaguchi |
| 2003/0196060 A1 | 10/2003 | Miller |
| 2005/0169219 A1 | 8/2005 | Serpa et al. |
| 2005/0192035 A1 | 9/2005 | Jiang |
| 2007/0213075 A1 | 9/2007 | Jiang |
| 2009/0083788 A1 | 3/2009 | Russell et al. |
| 2009/0164283 A1 | 6/2009 | Coley |
| 2009/0164293 A1 | 6/2009 | Coley |
| 2009/0254633 A1 | 10/2009 | Olive |
| 2009/0323677 A1 | 12/2009 | Mehmood et al. |
| 2011/0158171 A1 | 6/2011 | Centonza et al. |
| 2012/0040700 A1 | 2/2012 | Gomes et al. |
| 2012/0100884 A1 | 4/2012 | Radulescu et al. |
| 2012/0157100 A1 | 6/2012 | Suzuki et al. |
| 2012/0287800 A1 | 11/2012 | Siomina et al. |
| 2012/0302230 A1 | 11/2012 | Lim et al. |
| 2013/0034047 A1 | 2/2013 | Chan et al. |
| 2013/0040677 A1 | 2/2013 | Lee et al. |
| 2013/0102277 A1 | 4/2013 | Stenfelt et al. |
| 2013/0115993 A1 | 5/2013 | Jain et al. |
| 2014/0341101 A1 | 11/2014 | Ganapathy et al. |
| 2014/0349649 A1 | 11/2014 | Ganapathy et al. |
| 2014/0378123 A1 | 12/2014 | Stojanovski et al. |
| 2015/0029939 A1 | 1/2015 | Fujinami et al. |
| 2015/0056983 A1 | 2/2015 | Cho et al. |
| 2015/0124702 A1 | 5/2015 | Ozturk et al. |
| 2015/0230227 A1 | 8/2015 | Shi et al. |
| 2015/0304836 A1 | 10/2015 | Anslot et al. |
| 2015/0304888 A1 | 10/2015 | Masini et al. |
| 2015/0327127 A1 | 11/2015 | Centonza et al. |
| 2015/0350968 A1 | 12/2015 | Da Silva et al. |
| 2015/0350997 A1 | 12/2015 | Salqvist |
| 2016/0021483 A1 | 1/2016 | Wei |
| 2016/0127969 A1 | 5/2016 | Pao et al. |
| 2016/0164930 A1* | 6/2016 | Hua .................. H04L 29/06836 370/260 |
| 2016/0286465 A1* | 9/2016 | Wu ....................... H04W 48/08 |
| 2016/0286483 A1* | 9/2016 | Bergstrom ........ H04W 52/0229 |
| 2016/0309476 A1* | 10/2016 | Madan .............. H04W 72/0453 |
| 2016/0337845 A1* | 11/2016 | Noldus .................. H04W 8/26 |
| 2016/0345307 A1* | 11/2016 | Huang .................. H04W 48/10 |
| 2017/0127325 A1* | 5/2017 | Vikberg ................ H04W 36/14 |
| 2017/0332272 A1* | 11/2017 | Adjakple .............. H04W 36/22 |
| 2018/0270787 A1* | 9/2018 | Drevon ............... H04W 36/385 |

* cited by examiner

FIG. 6

| CONFIGURATION PARAMETER 610 | VALUE 620 | MEANING 630 |
|---|---|---|
| E-UTRAN CARRIERS PRIORITY | HIGH | E-UTRAN HIGHEST SELECTION PRIORITY FOR IDLE AND CONNECTED MODE |
| UTRAN CARRIERS PRIORITY | MEDIUM | UTRAN LOWER THAN E-UTRAN HIGHER THAN GERAN |
| GERAN CARRIERS PRIORITY | LOW | GERAN HIGHEST SELECTION PRIORITY FOR IDLE AND CONNECTED MODE |

600

| E-SPID | DELAY | PKT LOSS | PRIORITY | MOBILITY | POLICY |
|---|---|---|---|---|---|
| 101 | 100ms | $10^{-6}$ | HIGH | LOW | SMS OVER NAS REAL TIME |
| 102 | 100ms | $10^{-6}$ | HIGH | NORMAL | SMS OVER NAS REAL TIME |
| 103 | 100ms | $10^{-2}$ | LOW | LOW | REAL TIME LOWER PRIORITY |
| 104 | 100ms | $10^{-2}$ | LOW | NORMAL | REAL TIME LOWER PRIORITY |
| 105 | 100ms | $10^{-6}$ | HIGH | LOW | NEAR REAL TIME |
| 106 | 100ms | $10^{-6}$ | HIGH | NORMAL | NEAR REAL TIME |
| 107 | 100ms | $10^{-2}$ | LOW | LOW | NEAR REAL TIME LOWER PRIORITY |
| 108 | 100ms | $10^{-2}$ | LOW | NORMAL | DEFAULT LOW PRIORITY TRAFFIC |
| 109 | 1 minute | $10^{-2}$ | LOW | | DELAY TOLERANT ACCESS |
| 110 | 30 minute | $10^{-2}$ | LOW | | BACKUP TIMER |
| 111 | 24 hours | $10^{-2}$ | LOW | | DELAY TOLERANT |
| ... | | | | | |

FIG. 7

ACCESS CONTROL AND SCHEDULING MECHANISM FOR MTC DEVICES

CROSS-REFERENCE TO RELATED APPLICATIONS

This application is a continuation of prior co-pending U.S. patent application Ser. No. 15/953,575, filed Apr. 16, 2018 and titled "ACCESS CONTROL AND SCHEDULING MECHANISM FOR MTC DEVICES," which is a continuation of prior issued U.S. patent application Ser. No. 15/198,482, filed Jun. 30, 2016, now U.S. Pat. No. 9,961,527, issued May 1, 2018, and titled "ACCESS CONTROL AND SCHEDULING MECHANISM FOR MTC DEVICES," the contents of both of which are herein incorporated by reference in their entirety.

BACKGROUND

Machine to machine (M2M) communication allows wireless and/or wired systems communicate to with other devices without manual human interaction. M2M communications may include a wide range of applications for interaction between devices, such as monitoring and control for industrial automation, logistics, Smart Grid, Smart Cities, health, telematics, defense, etc. The data transferred during M2M communications may include different types and sizes that may be associated with different applications. For example, M2M communications may include short message service (SMS) messages, multimedia, telematics data, location date, sensor data, etc.

M2M communications may be transmitted over data transmission networks, such as a third generation partnership project (3GPP) network. 3GPP promulgates standards to implement wireless networking technologies including Long Term Evolution (LTE) networking technology (sometimes referred to as a "fourth generation" (4G) wireless networking technology). LIE standards define various aspects of an LTE network, including the communications technologies and protocols used to wirelessly communicate between "user equipment" (UEs) and "enhanced NodeBs" (eNodeBs) using a "radio access network" (RAN). UEs that engage in M2M communications may be described as Machine Type Communication (MTC) devices.

It is anticipated that a large volume of MTC devices will become deployed over time, which may cause network congestion issues. Various solutions have been proposed. For example, networks may be implemented to permit MTC devices to communicate over the network without establishing a user (data) radio bearer, which may be useful to reduce the amount of control signaling associated with MTC devices (e,g., the control signaling associated with managing data bearers for the MTC device). In such instances, the MTC devices may use control signaling paths/protocols, such as the Signaling Radio Bearer (SRB), Radio Resource Control (RRC) protocol and/or Non-Access Stratum (NAS) protocol, to send/receive communications through the network. However, the Signaling Radio Bearer has higher priority than any Data Radio Bearer (DBR) traffic, and therefore use of the control signaling path by MTC devices may significantly impact communications by other UEs sharing the network through increased congestion. Although delaying MTC devices by rejecting RRC connection requests during times of congestion may in some cases alleviate immediate traffic congestion issues, the subsequent connection attempts (e.g., retries) may create more RRC control signaling and thus not yield significant network usage savings.

BRIEF DESCRIPTION OF THE DRAWINGS

FIG. 6 is a table of exemplary SPIDs (Subscriber Profile Identifiers);

FIG. 7 is an exemplary SPID table; and

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may be implemented to differentiate between MTC user devices based on Subscriber Profile Identifiers (SPIDs) associated with particular MTC user devices. The systems/methods may use SPIDs to identify particular types of MTC user devices together with specific quality of service (QoS) parameters and mobility profiles. The systems/methods may determine improved scheduling for MTC user devices based on a media access control (MAC) scheduler and/or an operation administration and maintenance (OAM) scheduler. The MAC scheduler may schedule communications from MTC user devices according to designated QoS requirements while the OAM scheduler may use MTC user device traffic information to schedule MTC user device communication to non-peak times.

Consistent with embodiments, the systems and methods may provide improved access control for MTC user devices. In particular, the systems may implement improved access control based on utilization of extended access barring (EAB) corresponding to a specific probability of access barring for the particular MTC user device. Additionally, the systems may also implement improved access control based on utilization of an extended wait time to redirect to later times (or "back off") selected MTC user devices.

Figure 1:
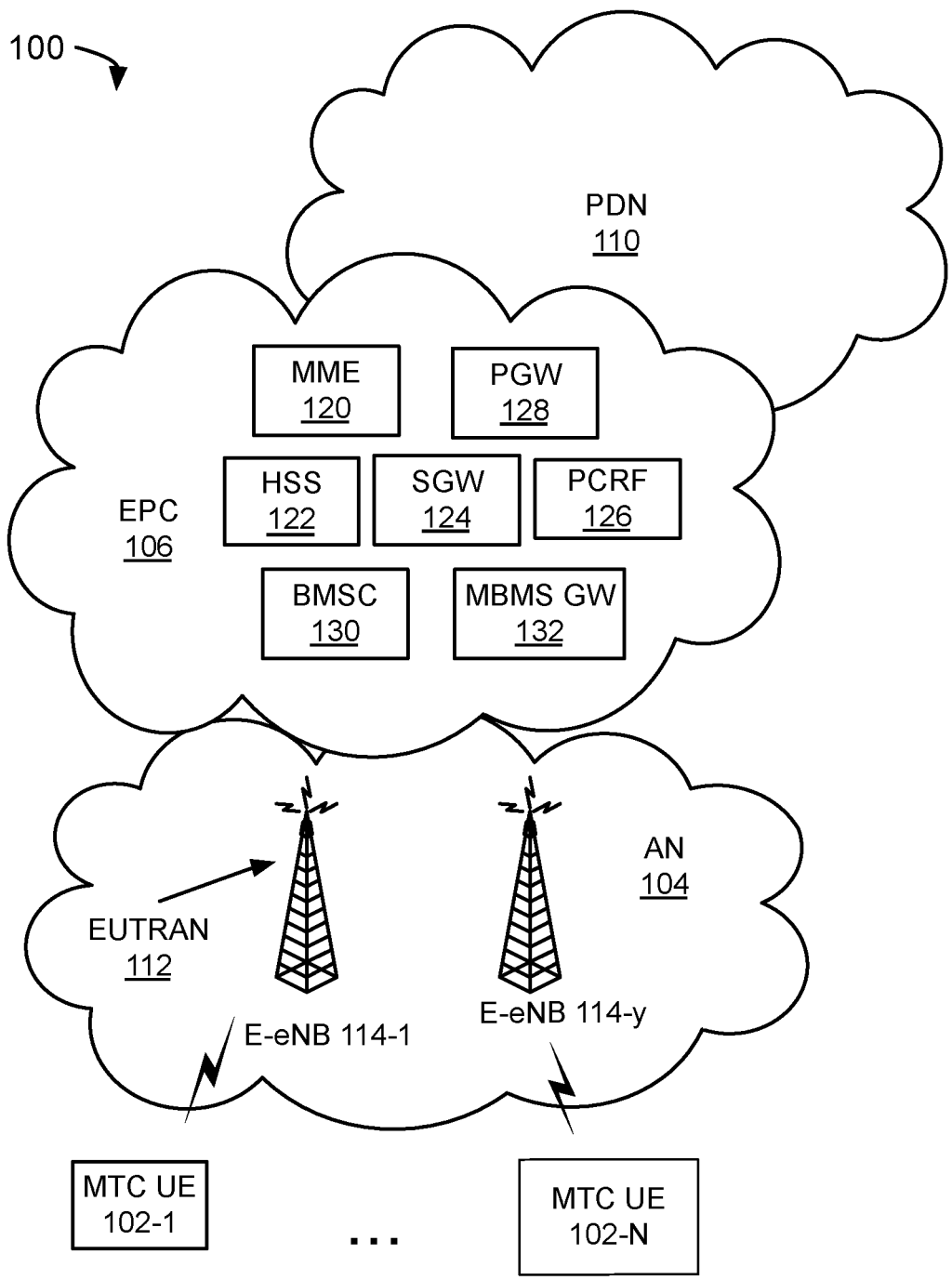
FIG. 1 is an exemplary blended data transmission network in which systems and/or methods described herein may be implemented.

FIG. 1 is a diagram of an exemplary LTE network 100. As illustrated, LTE network 100 includes a number of MTC user equipment (UE) (i.e., MTC user devices, shown as MTC UE 102-1 to MTC UE 102-n) (collectively referred to as MTC UEs 102 or individually as MTC UE 102), an access network (AN) 104, an evolved packet core (EPC) network 106, and a packet data network (PDN) 110, such as the Internet or a proprietary packet data network.

Access Network 104 may include an evolved universal terrestrial radio access network (E-UTRAN) 112 and a number of eNodeBs (eNBs) 114-1 to 114-y or enhanced node base stations (collectively referred to as enhanced eNodeBs 114 or individually as enhanced eNodeB 114). EPC 106 may include an enhanced mobility management entity (MME) 120, a home subscriber server (HSS)/authentication, authorization, and accounting (AAA) server 122, a serving gateway (SGW) 124, policy and charging rules function (PCRF) device 126, a PDN gateway (PGW) 128, a broadcast multicast service center (BMSC) 130, and a multimedia broadcast multicast service gateway (MBMS GW) 132. Devices/networks of network 100 may interconnect via wired and/or wireless connections.

Two MTC UEs 102, AN 104, EPC 106, PDN 110, E-UTAN 112, two enhanced eNodeBs 114, enhanced MME 120, HSS 122, SGW 124, PCRF 126, PGW 128, BMSC 130, and MBMS GW 132 have been illustrated in FIG. 1 for simplicity. In practice, there may be more or fewer devices or components. For example, a network 100 may include millions of subscriber MTC UEs 102, thousands of enhanced eNodeBs 114, hundreds of SGWS 124 and several PGWs 128 and MBMS GWs 130 effectively forming a hierarchical access network in which traffic passes from PDN 110 to MTC UE 102 via, for example, a particular MBMS GW 132, PGW 128, SGW 124, and enhanced eNodeB 114.

MTC UE 102 may be a user device associated with a subscriber that communicates via M2M communications. MTC UE 102 may include an Internet of Things (IoT) device such as a sensor, a machine, tools, wearables, vehicles, etc. MTC UE 102 may also include a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer, a personal computer, a tablet computer, or other types of computation or communication devices. In an exemplary implementation, MTC UEs 102 may include any device that is capable of communicating over access network 104, EPC network 106, and/or PDN 110. Example MTC UE 102 operates according to one or more versions of the LIE communication standard.

Access network 104 includes a communications network that connects subscriber devices (e.g., MTC UE 102) to the service provider network (e.g. EPC 106). In one example, access network 104 may include a Wi-Fi network or other access networks (e.g., in addition to E-UTRAN 112). EPC 106 may include a core network architecture of the 3GPP LTE wireless communication standard. PDN 110 includes a network that provides data services (e.g., via packets or any other Internet protocol (IP) datagrams). For example, PDN 110 may include the Internet, a private IP network, an intranet, etc.

E-UTRAN 112 includes a radio access network capable of supporting high data rates, packet optimization, large capacity and coverage, etc. E-UTRAN 112 includes a plurality of enhanced eNodeBs 114.

Enhanced eNodeBs 114 include network devices that operate according to one or more versions of the LTE communication standard and perform access and scheduling differentiation based on SPIDs as described herein below with respect to FIG. 4. For example, enhanced eNodeBs 114 may be configured to respond to UE requests, forward information regarding MTC UEs 102 to MME 120 and/or SGW 124, set up tunneling sessions with other devices (e.g., SGW 124 and PGW 128), etc. Enhanced eNodeBs 114 may include control plane connections to other network elements. In addition, enhanced eNodeBs 114 may receive information from enhanced MMEs 116 and determine access and scheduling differentiation for MTC UEs 102.

Enhanced MME 120 is responsible for idle mode tracking and paging procedures (e.g., including retransmissions) for MTC UEs 102 and may configure SPIDs to determine access control and scheduling for MTC UEs 102 via enhanced eNodeBs 114, as described below with respect to FIG. 3. Enhanced MME 120 may maintain information regarding a current state (e.g., powered on, location, etc. of each particular MTC UE 102. Enhanced MME 120 is also involved in the bearer activation/deactivation process (e.g., for MTC UE 102) and operates to choose a particular SGW 134 for MTC UE 102 at an initial attach time and at a time of intra-LTE handover. Enhanced MME 120 also authenticates MTC UEs 102 (e.g., via interaction with HSS 122). Non-access stratum (NAS) signaling from MTC UEs 102 terminates at enhanced MME 120 and enhanced MME 120 generates and allocates temporary identities to MTC UEs 102.

HSS/AAA 122 is configured to include a master user database that supports subscription-related information (e.g., subscriber profiles, device profiles), may perform authentication and authorization of a UE device based on requests received from MME 120, and may provide information about a UE's location and IP information.

SGW 124 routes and forwards user data packets, acts as a radio mobility anchor for user/data plane communications during inter-eNodeB handovers, and also acts as a radio anchor for mobility between LTE and other 3GPP technologies (referred to as "inter-3GPP mobility").

PGW 128 includes one or more data transfer devices (or network devices), such as a gateway, a router, a switch, a firewall, a network interface controller (NIC), a hub, a bridge, a proxy server, an optical add/drop multiplexer OADM, or some other type of device that processes and/or transfers data. PGW 128 provides connectivity of MTC UE 102 to external packet data networks (e.g., to PDN 110) by being a traffic exit/entry point for MTC UE 102. As described briefly above, MTC UE 102 may connect to PGW 128 via one or more tunnels established between enhanced eNB 110 and PGW 128, such as one or more GPRS Tunneling Protocol (GTP) tunnels. MTC 102 may simultaneously connect to more than one PGW for accessing multiple PDNs. PGW 128 may perform policy enforcement, packet filtering for each user, charging support, lawful intercept, and packet screening. PGW 128 may also act as an anchor for mobility between 3GPP and non-3GPP technologies. PGW 128 may perform session control signaling (e.g., session start/stop) towards the evolved universal terrestrial radio access network (E-UTRAN) via MME 120.

Figure 2:
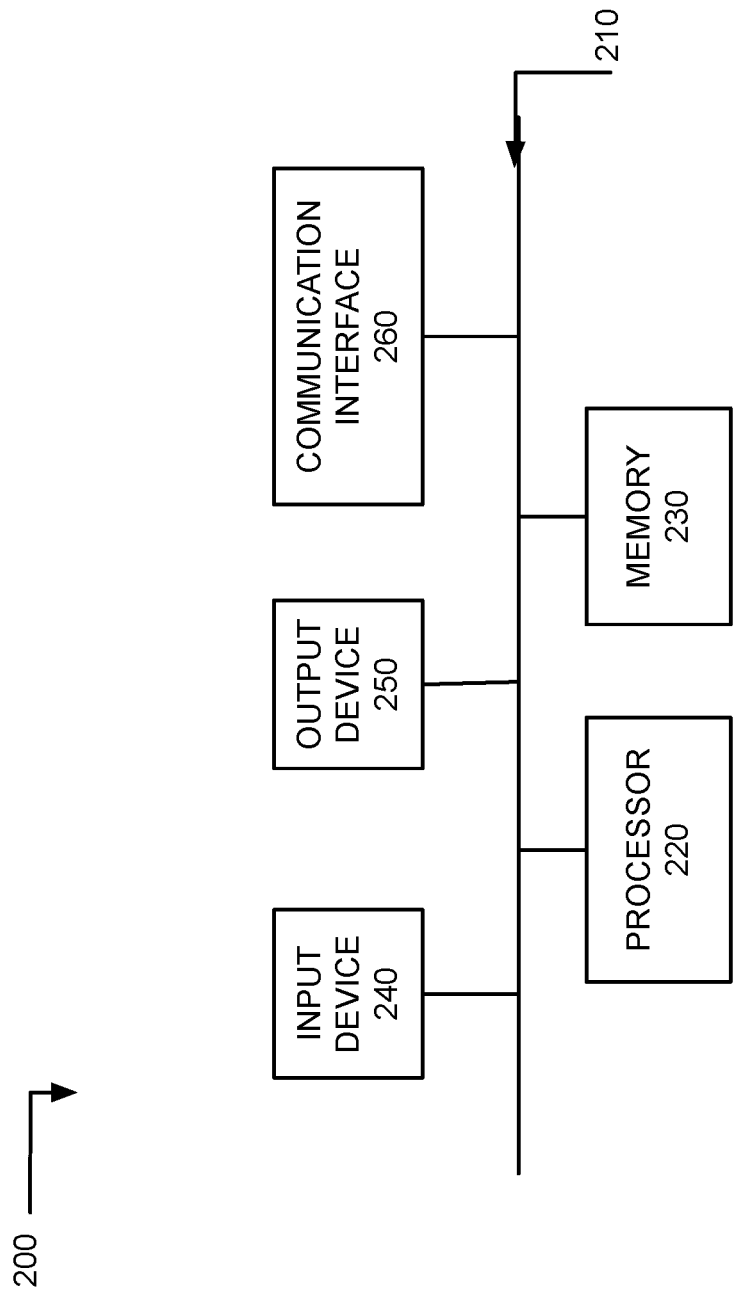
FIG. 2 is a block diagram of exemplary components of a device that may correspond to one of the devices of FIG. 1.

FIG. 2 is a diagram of exemplary components of a device 200 that may correspond to any of MTC UE 102, enhanced eNodeB 114, enhanced MME 120, HSS 122, SGW 124, PCRF 126, PGW 128, BMSC 130, or MBMS GW 132, as described in FIG. 1 above, or other devices described herein. As shown in FIG. 2, device 200 may include a bus 210, a processor 220, a memory 230, an input device 240, an output device 250, and a communication interface 260.

Bus 210 may permit communication among the components of device 200. Processor 220 may include one or more processors or microprocessors that interpret and execute instructions. In other implementations, processor 220 may be implemented as or include one or inure application specific integrated circuits (ASICs), field programmable gate arrays (FPGAs), or the like.

Memory 230 may include a random access memory (RAM) or another type of dynamic storage device that stores information and instructions for execution by processor 220, a read only memory (ROM) or another type of static storage device that stores static information and instructions for the processor 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include one or more transceivers that enables device 200 to communicate with other devices and/or systems. For example, communication interface 260 may include mechanisms for communicating with other devices, such as other devices of network 100.

As described herein, device 200 may perform certain operations in response to processor 220 executing software instructions contained in a computer-readable medium, such as memory 230. A computer-readable medium may include a non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processor 220 to perform processes described herein. Alternatively, hard-wired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these sit iations, device 200 may be a "headless" device that does not explicitly include an input or an output device. Alternatively, or additionally, one or more components of device 200 may perform one or more other tasks described as being performed by one or more other components of device 200.

As described herein, systems and methods may implement processes to differentiate between MTC user devices based on SPIDs associated with each particular MTC user device. The systems may use SPIDs to identify a particular type of MTC user device together with a specific quality of service (QoS) and mobility profile and determine access and control of the MTC user devices via enhanced eNodeBs.

Figure 3:
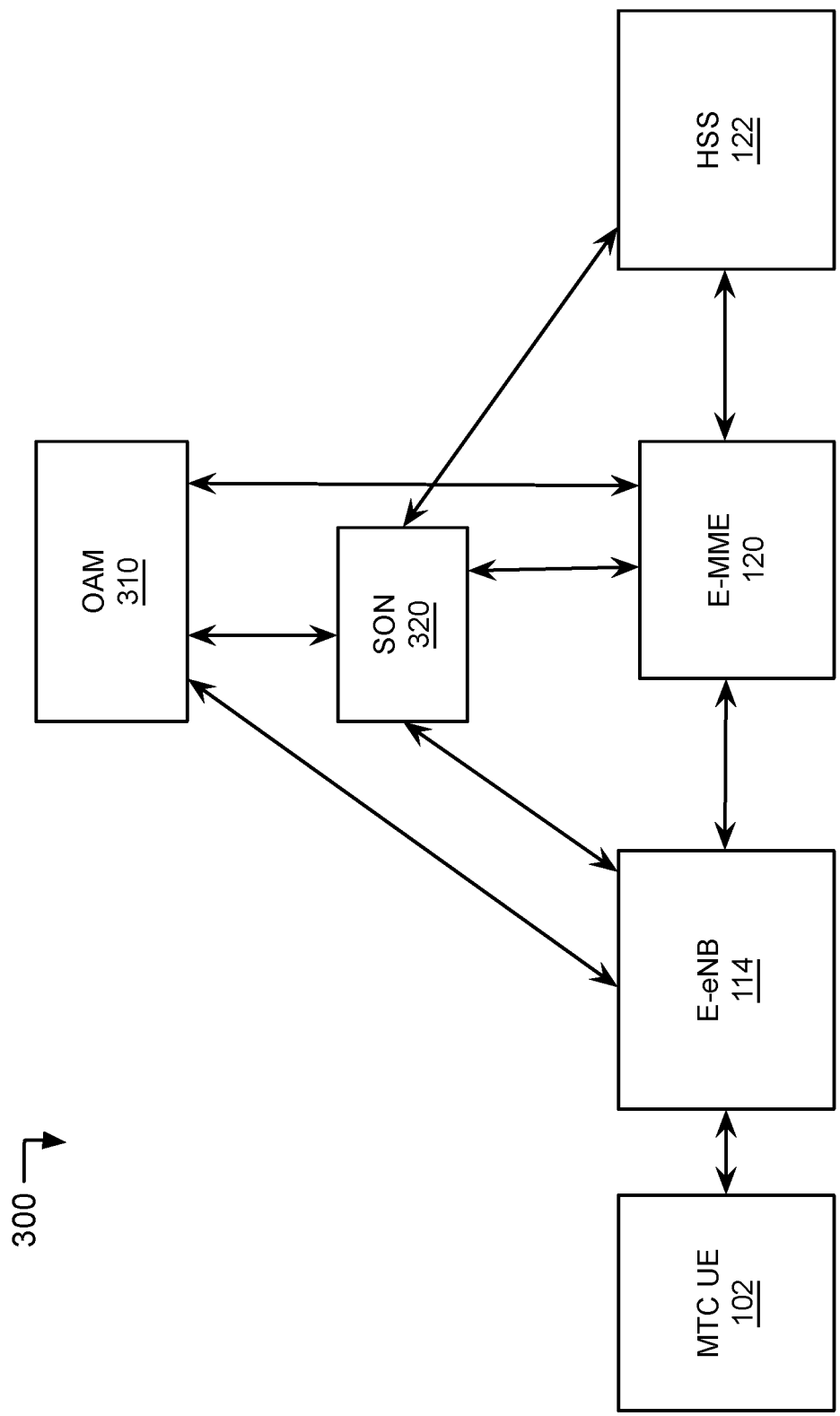
FIG. 3 is a diagram of exemplary functional components of the enhanced MME of FIG. 1.

FIG. 3 is a diagram of a network portion 300 for implementing MTC access and scheduling differentiation using SPIDs. As shown in FIG. 3, network portion 300 may include HSS 122, Operation administration maintenance (OAM) 310, self-organizing network (SON) controller 320, enhanced MME 120, enhanced eNodeB 114, and MTC UE 102.

SPIDs are currently used to carry information for Radio Access Technology (RAT) and/or Frequency Selection Priority that may be used to define camping priorities in idle mode and to control inter-RAT/inter-frequency handover in connected mode. SPIDs may have values within the range of 1-256. SPID values in the range of 1-128 are operator specific SPID values and SPID values in the range of 129-256 are reference values.

Network portion 300 may implement processes to improve eNodeB's 114 control and management of MTC devices using an enhanced SPID, for example, in instances in which a control-plane MTC communication implementation bypasses data bearer setup, such as described in the 3GPP LTE Release 13 and/or 14 standard for machine type communications. For example, Solution 2, one of two solutions provided by 3GPP for IoT optimization, is based on TR23.729 for IP data, non-IP data and SMS, in which data is sent over NAS/SRB without DRB establishment and therefore without QCI. Therefore an eNodeB will not be able to optimally allocate resources to MTC devices with appropriate QoS targets, resulting in waste of network resources and negative impact to other network users. eNodeB's may be limited to treating the MTC traffic as signaling traffic and give it higher priority than other non-MTC users who are on DRB. The enhanced SPID allows for the implementation of enhanced access and control functions in the network based on the assisting information indicated by the SPID.

HSS 122 may provide subscription-related information (e.g. subscriber/UE profiles), to enhanced MME 120. For example, HSS 122 may transmit the enhanced SPID to enhanced MME 120, for example, upon receiving a request for MTC UE 102 to attach to AN 104. HSS may store enhanced SPIDs corresponding to MTC UEs 102 that include information for access control and scheduling (e.g., as shown below with respect to FIG. 7 and table 700). Each enhanced SPID may continue to include an indication of preferred radio access RAT (e.g. LTE, HSPA) or frequency band of operation, for idle mode operation or for connection mode operation for an associated MTC UE 102. The enhanced SPID may indicate information such as a delay tolerance, packet loss tolerance, priority and mobility profile. The SPID for each MTC UE 102 may be set on initial configuration of the UE profile in HSS 122, and may also reflect changes observed from historical data, if available.

OAM 310 may include processes, activities and tools within the network portion 300 for operating, administering, managing and maintaining the system 100. OAM 310 may include a sub layer of network 100. OAM 310 may maintain information associated with MTC UEs 102 including SPIDs. OAM 310 may perform network data collection and monitoring in network 100. In some implementations, OAM 310 may be a passive component and SON 320 may perform active portions of the access control and scheduling mechanism based on interaction with network components.

SON 320 may interact with OAM 310 and a network component, such as MME 120, to control and define modified E-SPID based on network traffic and coverage, as well as UE device type and use cases (e.g., mobility, coverage and reliability needed) associated with MTC UEs 102. SON 320 may interact with enhanced MME 120 to perform OAM scheduling associated with MTC UEs 102. SON 320 may schedule MTC UEs 102 to certain non-peak times (e.g., to decrease network congestion) based, for example, on the priority of particular MTC communications. In addition, SON 320 may also determine a specific evolved packet core (EPC) associated with each MTC UE 102.

Enhanced MME 120 may interact with OAM 310 to perform OAM scheduling. Enhanced MME 120 may modify the SPID and provide enhanced eNodeB 114 with the modified enhanced SPID, such as described herein below with respect to FIG. 4. Enhanced MME 120 may transmit the SPIDs to enhanced eNodeBs 114.

Enhanced eNodeB 114 may use the SPID received from MME 120 as a reference to use when making decisions regarding MTC UEs 102 for access control, scheduling and load balancing/overload control as described herein below with respect to FIG. 5. For example, enhanced eNodeB 114 may determine access control for the MTC UE 102 based on a low access priority indication (LAPI) associated with the SPID that corresponds to a particular MTC UE 102. Enhanced eNodeB 114 may also use the SPID to perform media access control (MAC) scheduling. Enhanced eNodeB 114 may use the SPID in selecting a unique EPC 106 for the MTC UE 102 as further described with respect to FIG. 5 herein below.

Figure 4:
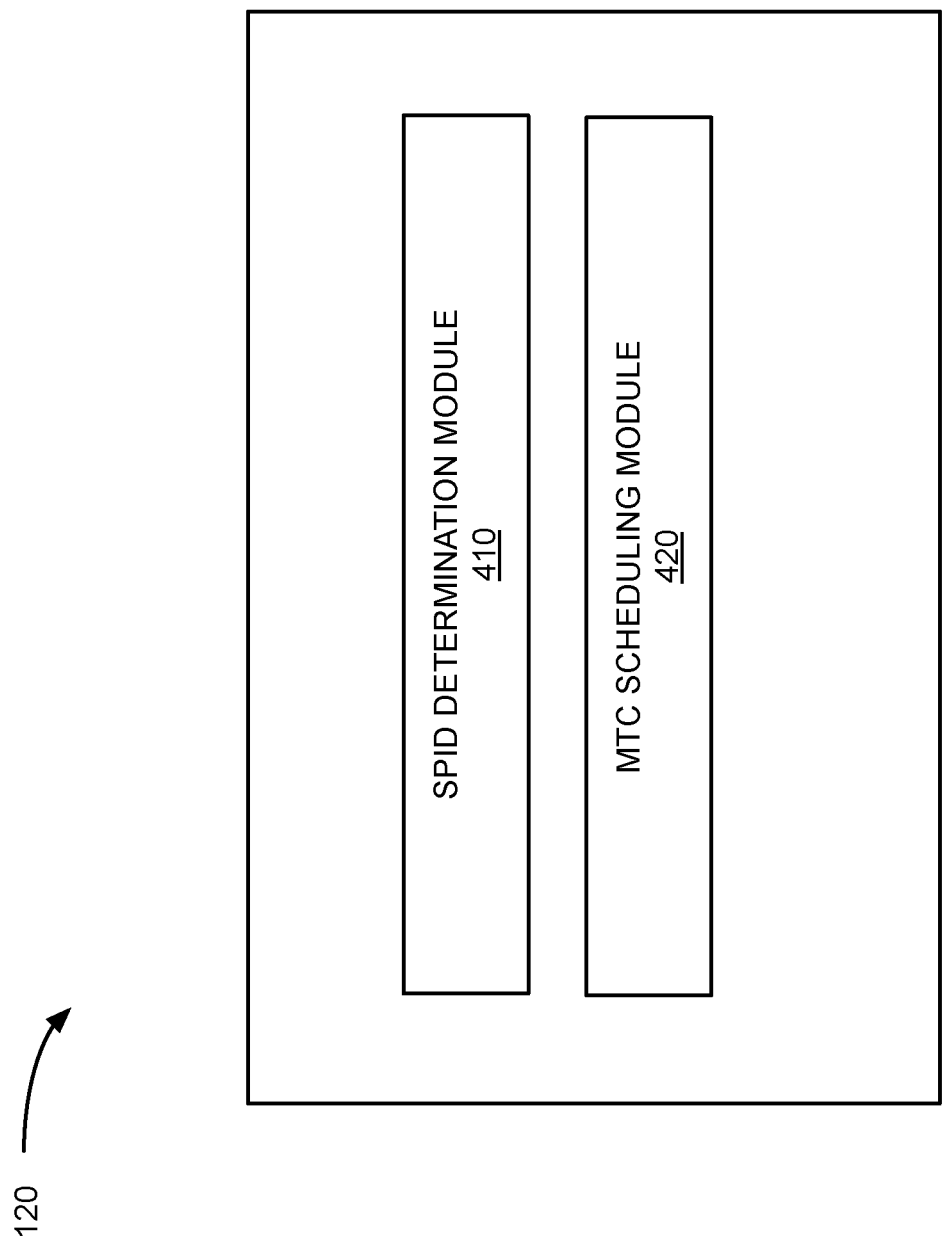
FIG. 4 is a diagram of exemplary functional components of the enhanced eNodeB of FIG. 1.

FIG. 4 illustrates an exemplary functional block diagram of a portion of enhanced MME 120. Enhanced MMI 120 may comprise software, hardware, or a combination of hardware and software. Enhanced MME 120 may include a SPID determination module 410 and an MTC scheduling module 420. The configuration of components of enhanced MME 120 illustrated in FIG. 4 is for illustrative purposes only. Other configurations may be implemented. Therefore, enhanced MME 120 may include additional, fewer and/or different components than those depicted in FIG. 4.

Although particular functions are described with respect to enhanced MME 120, these functions may be executed by a network control component in network 100 to provide improved scheduling and access control for MTC UEs 102.

SPID determination module 410 may modify SPIDs based on QoS information and application of resource management to provide access control, load balancing and scheduling differentiation for enhanced eNodeB 114. SPID determination module 410 may improve enhanced eNodeB's 114 control and management of MTC UEs 102 by providing SPIDs corresponding to the MTC UEs 102 that may include information associated with the MTC UEs 102 as described herein below with respect to FIGS. 6 and 7. SPID determination module 410 may modify SPIDs based on information such as core network congestion level or radio access network (RAN) loading level. Enhanced MME 120 may provide eNodeB 114 with SPIDs corresponding to MTC UEs 102.

MTC scheduling module 420 may interact with OAM 310 to perform OAM scheduling. MTC scheduling module 420 may schedule MTC transmissions for MTC UEs 102 to non-peak times. MTC scheduling module 420 may implement scheduling for payload from most MTC UEs 102 in a single signaling radio bearer (SRB) transmission via eNodeBs 114. MTC scheduling module 420 may combine OAM scheduling, which determines scheduling for MTC transmission during non-peak times, with MAC scheduling, which may delay MTC transmission in instances in which the radio resources become heavily congested.

Figure 5:
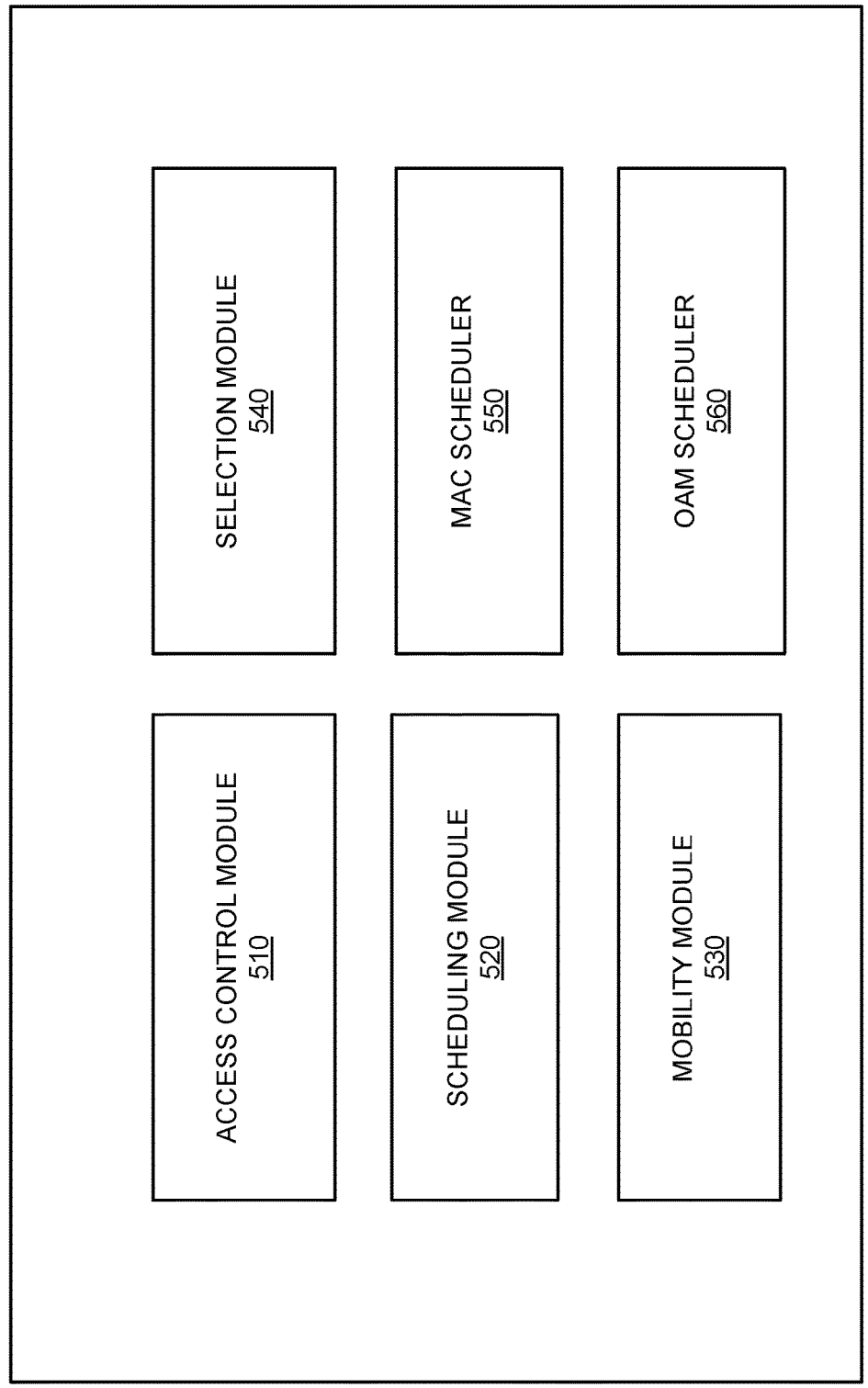
FIG. 5 is a diagram of a network portion for access control and scheduling of MTC devices.

FIG. 5 illustrates an exemplary functional block diagram of a portion of enhanced eNodeB 114. Enhanced eNodeB 114 may comprise software, hardware, or a combination of hardware and software. Enhanced eNodeB 114 may include an access control module 510, scheduling module 520, mobility module 530, selection module 540, MAC scheduler 550 and OAM scheduler 560. The configuration of components of enhanced eNodeB 114 illustrated in FIG. 5 is for illustrative purposes only. Other configurations may be implemented. Therefore, enhanced eNodeB 114 may include additional, fewer and/or different components than those depicted in FIG. 5.

Access control module 510 may use enhanced SPIDs (such as described herein below with respect to FIG. 7 and table 700) associated with particular MTC UEs 102, received from enhanced MME 120, as reference to make decisions on access control (e.g., through EAB). Access control module 510 may utilize the EAB to specify probability of access barring of the MTC UE 102. Access control module 510 may also utilize the extended wait time to back off the MTC UE 102.

Access control module 510 may identify the MTC UE's 102 delay, packet loss requirement and relative priority from the SPID. Access control module 510 may use the information to perform access control and load balancing. Access control module 510 may provide improved access control based on requirements of the MTC UEs 102 indicated by the information included in the SPID. Access control module 510 may use the SPID from MTC UEs 102 to perform load balancing/overload control (e.g., redirect MTC UEs 102 to other enhanced eNodeB 114 or reset idle mode cell selection parameters). For example, access control module 510 may load balance based on the priority and other variables included in the SPID and the availability of network resources. Access control module 510 may use local information for the eNodeB 114, such as a radio condition for the MTC UE 102, loading for the eNodeB 114 and loading for neighboring eNodeBs 114. For example, if the serving eNodeB 114 is experiencing a high loading and its neighboring eNodeBs 114 are not as heavily loaded, the serving eNodeB 114 may look at the SPIDs and redirect MTC UEs 102 with lower priority and higher delay budget to the neighboring eNodeBs 114.

Scheduling module 520 may use the information from SPIDs associated with particular MTC UEs 102 to implement scheduling (e.g., decide when to allow the transmission for the MTC UE 102 by MAC scheduling). MAC scheduler 550 may schedule communication from the MTC UE 102 according to designated QoS requirement. OAM scheduler 560 may use UE traffic information to schedule the UE to non-peak times. Scheduling module 520 may differentiate MTC UEs 102 through scheduling.

Mobility module 530 may identify a MTC UE's 102 QoS and mobility profile. QoS may be negotiated between MTC UE 102 and PDN 110 during data bearer set-up. During PDN set up, the QoS class identifier (QCI) may be provided to the eNodeB 114. Mobility module 530 may determine the historical mobility of MTC UEs 102 in other cells based on information transmitted from enhanced MME 120 to the eNodeB 114 (e.g., received at MME 120 from OAM 310, which may maintain mobility information for MTC UEs 102). Mobility module 530 may determine mobility of the MTC UE 102 based on whether the MTC UE 102 stays within a particular area associated with a particular eNodeB 114 or the MTC UE 102 moves around.

Mobility module 530 may also select a unique EPC 106 for each particular MTC UE 102 based on the mobility profile. In some instances, mobility module 530 may select a M2M EPC, which may manage M2M traffic. Mobility module 530 may access the MTC UE's 102 mobility profile to make better mobility decisions. In addition to performing MME selection, mobility module 530 may perform frequency layer selection. For example, mobility module 530 may determine that a high-mobility MTC UE 102 is to be directed to a coverage layer (e.g., layer B13). In addition, mobility module 530 may direct communications from the particular MTC UE 102 up to a low mobility layer (e.g., layer B4).

Selection module 540 may derive MTC UE's 102 specific cell reselection priorities to control idle mode camping of the MTC LIE 102. Selection module 540 may use information to redirect active mode MTC UEs 102 to different frequency bands or Radio Access Technologies (RATs). Selection module 540 may use the information included in the modified SPID to control inter-RAT and inter-frequency redirection for the MTC UE 102 in connected mode. Selection module 540 may use information to provide MTC UE 102 QoS used for radio resource management (RRM) within the same frequency/RAT.

FIG. 6 illustrates a configuration table 600 of an exemplary SPID in previously known implementations. FIG. 6 illustrates the SPID by way of example. Other SPID values may be received and modified within network 100.

As shown in FIG. 6, table 600 illustrates a current 3GPP table that may be used for frequency cartier/RAT selection based on SPID values. Table 600 includes a configuration parameter 610 that may indicate a priority of a particular type of access network with regard to other types of access networks. For example, in this instance the configuration parameter 610 for an evolved universal terrestrial radio access network (E-UTRAN) corresponds to a value 620 of the E-UTRAN carriers priority as "high." The high value (620) indicates that the selection priorities (630) for idle and connected mode of all E-UTRAN carriers are higher than the priorities for all universal terrestrial radio access network (UTRAN) and GSM EDGE Radio Access Network (GERAN) carriers.

UTRAN carriers priority that corresponds to a value of "medium" may indicate that the selection priorities for idle and connected mode of all UTRAN carriers are lower than the priorities for all E-UTRAN carriers and higher than the priorities for all GERAN carriers.

GERAN carriers priority that corresponds to a value of "low" may indicate that the selection priorities for idle and connected mode of all GERAN carriers are lower than the priorities for all E-UTRAN carriers and UTRAN carriers.

Other SPIDs may indicate the relative E-UTRAN carrier's priority, UTRAN carrier's priority or GERAN carrier's priority. The value corresponding to each of the networks may be high, medium or low, which may indicate the relative selection priorities for idle and connected mode of MTC UEs 102.

For example, a SPID with a value of "256" may indicate that E-UTRAN (LTE) has high priority, and GERAN (GSM) has low priority (such as shown in FIG. 6), while a SPID with a value of "254" may indicate that GERAN (GSM) has high priority and E-TRAN (LTE) has low priority.

FIG. 7 illustrates an exemplary enhanced SPID table 700. Table 700 identifies enhanced SPIDs (E-SPIDs) 101 to 111 (705) and corresponding delay 710, packet (pkt) loss (720), priority (730), mobility (740), and policy (750) for each of the E-SPIDs 705.

Table 700 illustrates one manner in which the SPID information, such as shown in table 600, may be expanded to provide additional information for access and control. Multiple variations of table 700 may be constructed based on additional information that is available and/or required. Table 700 may be deployed to and used in the eNodeB 114 and/or MME 120 for access control decisions. A MTC UE 102 ID may be mapped to an E-SPID and in instances in which a transmit request is received, the eNodeB 114 may allow or deny the transmit request based on the E-SPID.

As shown in table 700, the E-SPIDs extend the information associated with current SPIDs, such as shown in FIG. 6, to contain critical QoS information enabling eNodeB 114 and MME 120 to perform advanced resource management in network 100 associated with MTC UEs 102. In one embodiment, the operator specific SPID values in the range of 1-128 may be defined to include information corresponding to delay 710, packet loss 720, priority 730, mobility 740, and policy 750 as shown, by way of example, in FIG. 7 (i.e., correlated to E-SPIDs). The information may be selected to fit MTC UE's 102 traffic profile. For example, a particular delay 710, packet (pkt) loss (720), priority (730), mobility (740), and policy (750) may be selected to match the MTC UE 102. The E-SPIDs may be defined and stored in HSS 122 for corresponding MTC UEs 102.

The delay 710 associated with each E-SPID may be defined to allow delay of the order of 100 ms (E-SPIDs 101 to 108), 1 minute (E-SPID 109), 30 minutes (E-SPID 110), 24 hours (E-SPID 111), etc. Similarly, a packet loss 720 for MTC communications via the MTC UEs 102 may be defined (e.g., $10^{-6}$ for E-SPIDs 101, 102 and 100 and $10^{-2}$ for E-SPIDs 103-105 and 107-111). A priority level 730 may be defined for each of the E-SPIDs (e.g., high for E-SPIDs 101, 102, 105 and 106 and low for E-SPIDs 103, 104, and 107-111). A mobility level 740 may also be defined for each of the E-SPIDs (e.g., low for E-SPIDs 101, 103, 105 and 107 and normal for E-SPIDs 102,104, 106, and 108).

An access policy 750 associated with each type of MTC traffic profile for MTC UEs 102 may be determined and included in the E-SPIDs. For example, the policy 750 may include a policy of short message service (SMS) over non access stratum (NAS) and real time (shown with respect to E-SPIDs 101 and 102). The access policy 750 may include real time with lower priority (E-SPIDs 103 and 104), near real time (E-SPIDs 105 and 106), or near real time with lower priority (E-SPID 107). Other access policies 750 may include default low priority traffic (E-SPID 107). The policy 750 may alternately include delay tolerant access with back up timer (E-SPIDs 109 and 110) or delay tolerant (E-SPID 107). In some implementations, operators using SPID for RAT may reserve SPID values for those RAT, while expanding the values for M2M use cases.

Figure 8:
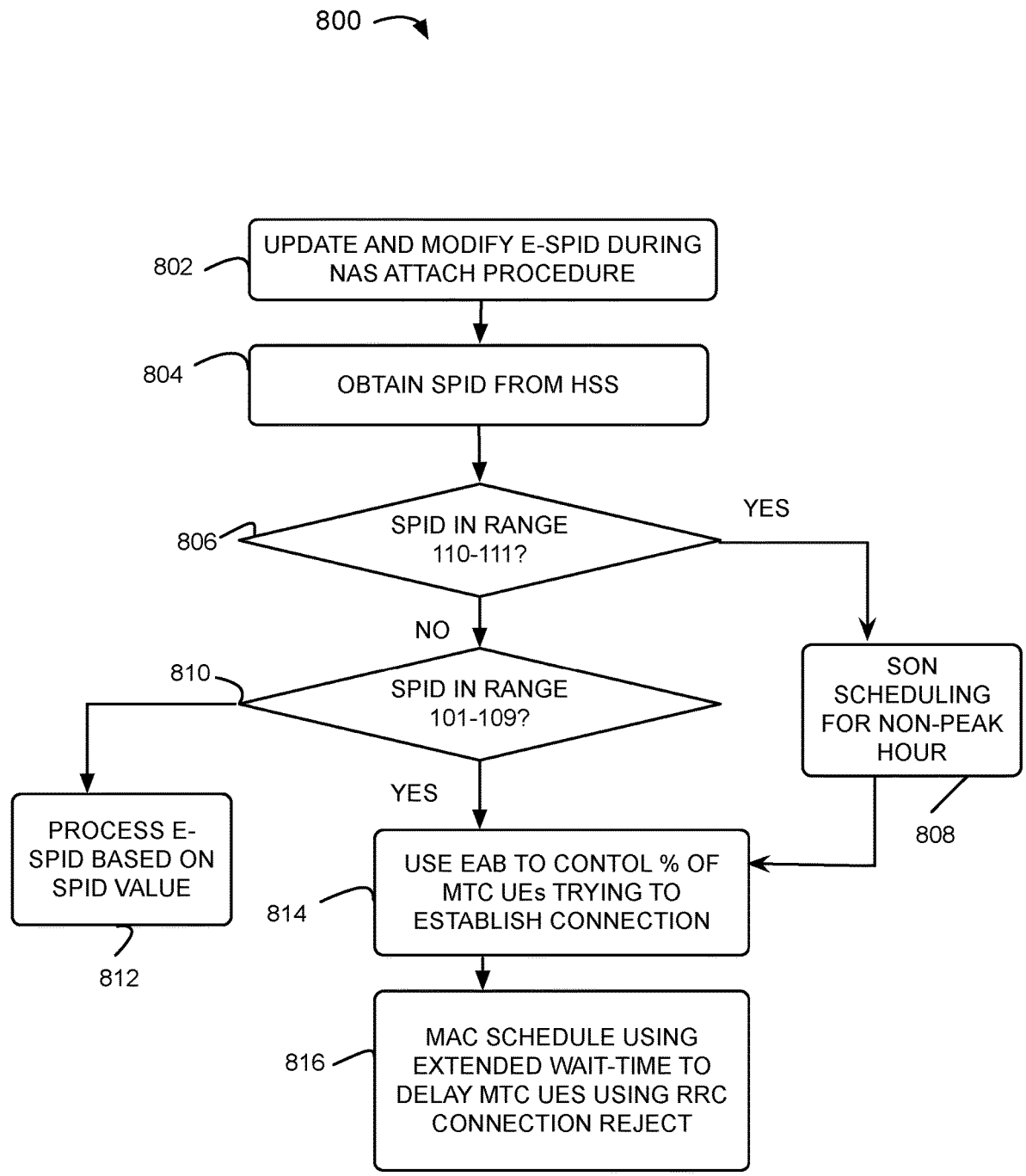
FIG. 8 is a flow chart of an exemplary process for implementing access control and scheduling of MTC devices according to an implementation described herein.

FIG. 8 is a flow chart of an exemplary process 800 for implementing access control and scheduling of MTC devices according to implementations described herein. Process 800 is described with respect to enhanced eNodeB 114 shown in FIGS. 1 and 4, for illustrative purposes. In one implementation, process 800 may be performed by enhanced MME 120 and enhanced eNodeB 114. In another implementation, some or all of process 800 may be performed by another device or group of devices, including or excluding enhanced eNodeB 114.

As shown in FIG. 8, at block 802, the E-SPID may be updated and modified during the NAS attach procedure for an MTC UE 102. For example, HSS 122 may transmit th E-SPID (e.g., including information such as described with respect to FIG. 7, hereinabove to MME 120 during the NAS attach procedure for the MTC UE 102. HSS 122 may update the HSS 122 database with a current location of the MTC UE 102 and send the subscriber profile information with the E-SPID to the MME 120 in an Update Location Acknowledge message.

MME 120 may modify the E-SPID, for example, based on network congestion level and send the S1 Application Protocol (S1AP) Initial Context Setup Request, which contains the (possibly) modified E-SPID, to the eNodeB 114 to create a context for this MTC UE 102. The S1AP initial Context Setup Request also includes the bearer Context and the security Context.

Enhanced eNodeB 114 may obtain the E-SPID via enhanced MME 120 (block 804). The E-SPID formatted to include information such as described above with respect to FIG. 7 and table 700. The E-SPID may have been modified by enhanced MME 120 based on local information such as core network congestion level and/or RAN loading level.

Enhanced eNodeB 114 may initially determine whether the E-SPID is in the range 110 to 111 (block 806). The range may be selected based on an associated delay tolerance that exceeds a threshold amount (for example, 30 minutes). In instances in which the E-SPID is in the range 110-111 (indicating a delay tolerance that exceeds the threshold), enhanced eNodeB 114 may communicate with SON 320 to assign OAM scheduling for non-peak times (block 808). MTC communications may thus be scheduled for non-peak times.

In instances in which the E-SPID is not in the range 110-111, enhanced eNodeB 114 may determine whether the E-SPID is in the range 101-109 (block 810), indicating that the E-SPID indicates MTC device QoS information. If the E-SPID is not in the range 101-109 (block 810-no), enhanced eNodeB 114 may process the E-SPID using conventional handling (e.g., indicating that the device does not need the enhanced MTC device QoS processing described herein) (block 812). Enhanced eNodeB 114 may process the E-SPID based on the SPID value as described above with respect to FIG. 6.

In instances in which the E-SPID is in the range 101-109 (block 810—yes), Enhanced eNodeB 114 may use EAB to control the percentage of MTC UEs 102 that are attempting to establish connection (block 814).

At block 816, enhanced eNodeB 114 may schedule MTC UEs 102 with the MAC scheduler (not shown) using extended wait time to delay MTC UE 102 using RRC Connection reject. In instances in which the network is congested, the RRC Connection Request may be rejected for those low priority MTC 102 devices, and an extended wait time value (i.e., the extendedWaitTime) may be included in the RRC Connection Reject message.

Systems and/or methods described herein may differentiate between MTC user devices based on E-SPIDs associated with particular MTC user devices. The systems may use E-SPIDs to identify a particular MTC user device together with specific QoS and mobility profile. The systems may determine improved scheduling for MTC user devices based on a MAC scheduler and/or an OAM scheduler.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 8, the order of the blocks may be modified in other implementations. Further, non-dependent blocks may be performed in parallel.

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
receiving, at an access node associated with at least one machine type communications (MTC) user device, an enhanced subscriber profile identifier (E-SPID) associated with the MTC user device, wherein the E-SPID corresponds to access and control values associated with the at least one MTC user device;
at the access node, determining whether the E-SPID is in a first range of E-SPID values, wherein the first range of E-SPID values corresponds to MTC device quality of service information that tolerates delay above a threshold value;
when the E-SPID is in the first range of E-SPID values, assigning a schedule that performs communication with the at least one MTC user device during non-peak times;
at the access node, determining whether the E-SPID is in a second range of E-SPID values, wherein the second range of E-SPID values corresponds to MTC device quality of service information that does not tolerate delay above the threshold value;
when the E-SPID is in the second range of E-SPID values, using the MTC device quality of service information to perform at least one of access control, scheduling or load balancing of communication with the at least one MTC user device.

2. The computer-implemented method of claim 1, further comprising:
when the E-SPID is in the second range of E-SPID values, performing access control that includes extended access bearer (EAB) for the at least one MTC user device based on the E-SPID.

3. The computer-implemented method of claim 1, further comprising:
when the E-SPID is in the second range of E-SPID values, performing medium access control (MAC) scheduling for the at least one MTC user device based on the E-SPID.

4. The computer-implemented method of claim 3, wherein performing the MAC scheduling further comprises:

performing the MAC scheduling using extended wait time to delay MTC devices using radio resource control (RRC) connection reject.

5. The computer-implemented method of claim 1, further comprising:
when the E-SPID is in the second range of E-SPID values, performing load balancing for a plurality of MTC user devices that include the at least one MTC user device based on the E-SPID.

6. The computer-implemented method of claim 1, further comprising:
connecting the at least one MTC user device to an M2M-specific core network based on the E-SPID.

7. The computer-implemented method of claim 1, wherein the at least one access network node is operable to perform access control and scheduling for the at least one MTC user device based on radio conditions for the MTC user device.

8. The computer-implemented method of claim 1, wherein the at least one access node is operable to perform access control and scheduling for the at least one MTC user device based on at least one of loading and neighbor access network node loading for the at least one access network node.

9. The computer-implemented method of claim 1, wherein the E-SPID correlates to one of a packet loss tolerance, an access policy associated with the at least one MTC user device, or a mobility policy associated with the at least one MTC user device.

10. A non-transitory computer readable medium storing instructions that when executed by a processor cause the processor to perform the method of claim 1.

11. A network controller device, comprising:
a memory to store a plurality of instructions; and
a processor configured to execute the instructions that, when executed by the processor, cause the processor to:
receive an enhanced subscriber profile identifier (E-SPID) associated with at least one machine type communications (MTC) user device, wherein the E-SPID corresponds to access and control values associated with the at least one MTC user device;
determine whether the E-SPID is in a first range of E-SPID values, wherein the first range of E-SPID values corresponds to MTC device quality of service information that tolerates delay above a threshold value;
when the E-SPID is in the first range of E-SPID values, assign a schedule that performs communication with the at least one MTC user device during non-peak times;
determine whether the E-SPID is in a second range of E-SPID values, wherein the second range of E-SPID values corresponds to MTC device quality of service information that does not tolerate delay above the threshold value;
when the E-SPID is in the second range of E-SPID values, use the MTC device quality of service information to perform at least one of access control, scheduling or load balancing of communication with the at least one MTC user device.

12. The network controller device of claim 11, wherein when the E-SPID is in the second range of E-SPID values, performing access control that includes extended access bearer (EAB) for the at least one MTC user device based on the E-SPID.

13. The network controller device of claim 11, wherein when the E-SPID is in the second range of E-SPID values, performing medium access control (MAC) scheduling for the at least one MTC user device based on the E-SPID.

14. The network controller device of claim 13, wherein performing the MAC scheduling uses extended wait time to delay MTC devices using radio resource control (RRC) connection reject.

15. The network controller device of claim 11, wherein when the E-SPID is in the second range of E-SPID values, performing load balancing for a plurality of MTC user devices that include the at least one MTC user device based on the E-SPID.

16. The network controller device of claim 11, wherein the instructions further cause the processor to:
connect the at least one MTC user device to an M2M-specific core network based on the E-SPID.

17. The network controller device of claim 11, wherein the instructions further cause the processor to:
perform access control and scheduling for the at least one MTC user device based on radio conditions for the MTC user device.

18. The network controller device of claim 11, wherein the instructions further cause the processor to:
perform access control and scheduling for the at least one MTC user device based on at least one of loading and neighbor access network node loading for the at least one access network node.

19. The network controller device of claim 11, wherein the E-SPID correlates to one of a packet loss tolerance, an access policy associated with the at least one MTC user device, or a mobility policy associated with the at least one MTC user device.

* * * * *